Patented Nov. 2, 1943

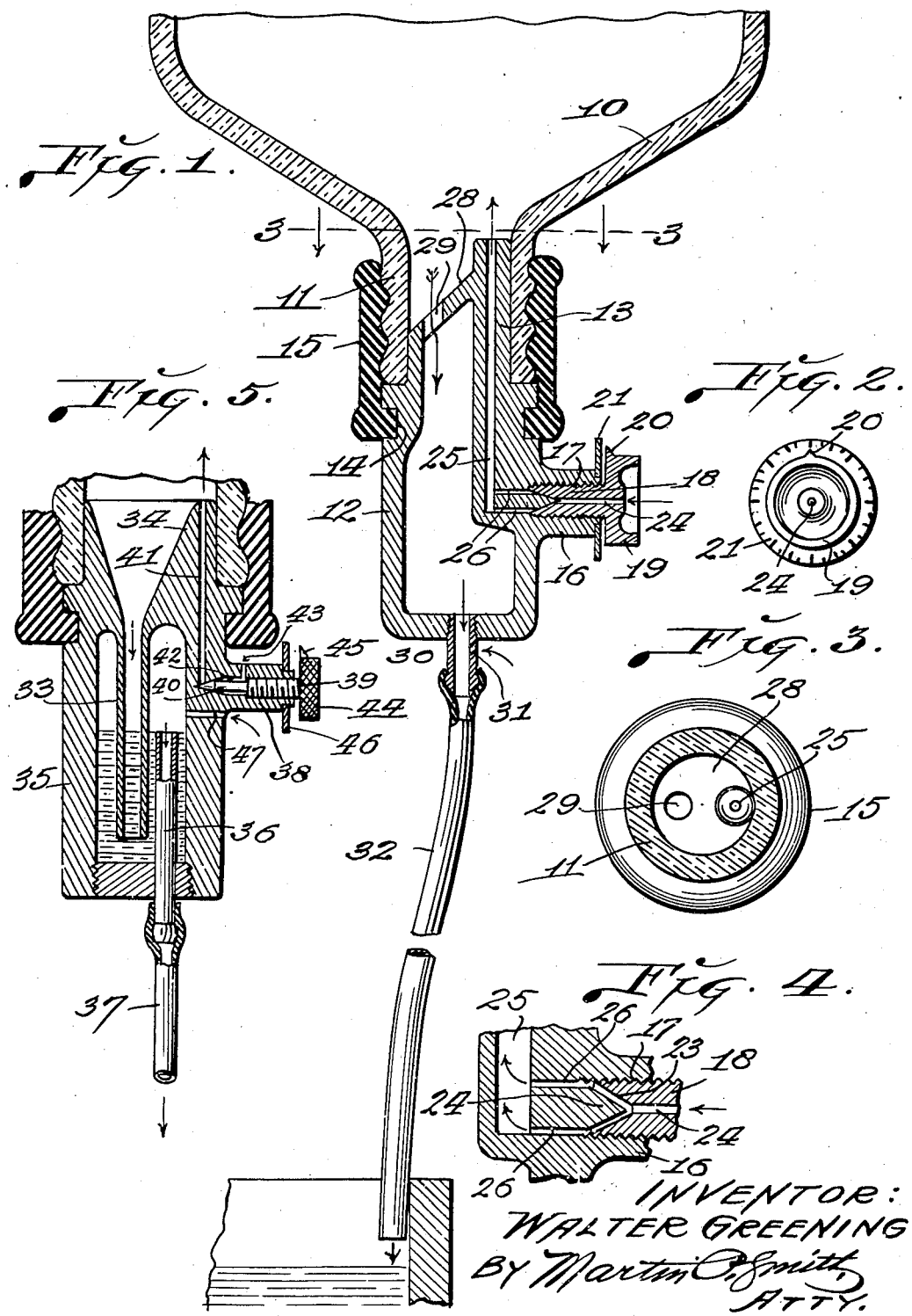

2,333,310

UNITED STATES PATENT OFFICE 2,333,310

FLUID FLOW CONTROL VALVE

Walter Greening, Los Angeles, Calif.

Application May 13, 1940, Serial No. 334,830

1 Claim. (Cl. 221—28)

My invention relates to a fluid flow control valve and has for its principal object, to provide a relatively simple, practical and inexpensive valve that will be effective in controlling the flow of liquids and further, to construct the valve and provide the same with simple means for accurately regulating the volume of liquid flow through the device, particularly where a constant flow of liquid is required.

Valves constructed in accordance with my invention may be advantageously employed wherever a regulated constant flow of liquid is desired and the particular forms of valves herein illustrated and described are especially designed for regulating the constant flow of liquid fertilizer or chemicals to water that is distributed on the ground used for the growing of plants, vegetables, crops, and the like.

A further object of my invention is to provide a constant flow regulating valve that may be conveniently connected to the necks and mouths of the conventional containers utilized by the manufacturers and producers of liquid fertilizers.

A further object of my invention is to provide a flow control valve of the character referred to that may be conveniently adjusted and set so as to permit constant flow of liquid as a result of gravity and the controlled admission of air to the container to which the control valve is connected.

A further object of my invention is to provide a valve wherein the flow of liquid therethrough is constant and not affected by surface tension developed during the flow of liquid through the valve and the duct leading therefrom and likewise not affected by varying air pressure conditions that might develop in said valve and the outlet therefrom.

With the foregoing and other objects in view, my invention consists in certain novel features of construction and arrangement of parts that will be hereinafter more fully described and claimed and illustrated in the accompanying drawing in which:

Fig. 1 is a vertical section taken lengthwise through the center of the constant flow control valve constructed in accordance with my invention and showing the same applied to the outlet of a container.

Fig. 2 is an elevational view of the calibrated member and head of the air valve that are used for regulating the admission of air to the valve and the container to which said valve is connected.

Fig. 3 is a horizontal section taken on the line 3—3 of Fig. 1.

Fig. 4 is an enlarged detail section of the valvular means used for controlling the admission of air through the device.

Fig. 5 is a vertical section similar to Fig. 1 and showing a modified form of the valve.

Referring by numerals to the accompanying drawing, 10 designates a conventional container utilized by manufacturers and distributors of liquid fertilizers and the like, said container having the general form of a bottle and provided with a neck 11 that is externally threaded for the reception of a screw cap.

The body of my improved valve is in the form of a short, hollow, cylindrical member 12, from the upper end of which projects upwardly a short plug portion 13 that is adapted to fit snugly within the opening through the neck 11 of the container.

Formed in the upper portion of the body 12 just below the plug portion 13 is a circumferential flange 14 that receives the in-turned lip of a collar 15, preferably formed of rubber or the like, and the upper portion of which collar engages the external threads on the neck 11 of the container, thus firmly connecting the valve to the container and providing fluid pressure tight joints between the valve and the container.

Formed integral with the valve body 12 just below the groove 14 is an outwardly projecting lug 16 in which is formed a horizontally disposed threaded recess 17 and screw seated therein is a short externally threaded plug 18 provided on its outer end with a head 19. Projecting outwardly from the inner edge of head 19 is a short finger 20 that is adapted to co-operate with the graduations on the face of a disc 21 that is secured on the outer end of lug 16.

Formed integral with the body of the valve at the inner end of the threaded recess 17 therein is a conical lug 22 that projects into the inner end portion of said recess and the inner end of the plug 18 is provided with a conical recess 23 that snugly receives the lug 22 when the plug 18 is screwed to its limit of movement into the threaded recess in lug 16.

Formed through plug 18 and head 19 is an axial bore 24 which is for the purpose of admitting air into the valve.

Formed through the wall of the valve body 12 and plug 13 on the same side with and above lug 16 is a vertically disposed duct 25 and communicating with the lower end thereof is a plurality of small ducts 26 that lead from the inner end of the recess 17 that receives plug 18.

The chamber within plug 13 is closed at its upper end by an inclined wall 28 disposed a short distance below the upper end of that portion of the wall in which duct 25 is formed, and formed through the lower portion of the inclined wall 28 a substantial distance below the upper end of said duct 25 is an opening 29 that permits liquid from the container 10 to flow freely into the chamber within the valve body 12. By inclining the wall 28 downwardly toward the opening 29 that leads to the chamber within the valve body, any sediment that may be present in the liquid fertilizer will flow by gravity downward into said chamber instead of accumulating and finally closing the upper end of air inlet duct 25.

Depending from the lower end of body 12 is a short tubular outlet 30 through the wall of which is formed a small air inlet opening 31 and connected to the lower end of said outlet tube is a duct 32, for instance, a flexible tube that leads to a tank or irrigation ditch containing water that is to be treated with liquid fertilizer or the like.

After the valve has been applied to the neck of a liquid fertilizer container and secured thereto by the collar 15, plug 18 is screwed into the recess 17 so as to close communication between air duct 24 and the ducts 26.

The container 10 is now turned upside down with the discharge end of tube 32 positioned so as to deliver the liquid fertilizer or the like into the water that is to be treated. Head 19 on the end of screw plug 18 is now engaged and rotated so as to move said plug outwardly within lug 16, thereby breaking the seal between the conical member 22 and surface of the conical recess 23 in the end of the screw plug so that air may pass through duct 24, thence through ducts 26 and upwardly through duct 25 into the lower portion of container 10. This air passes to the upper end of the container and permits liquid within said container to flow downwardly through opening 29, thence through the chamber within plug 12, thence through tubular member 30 and from thence through tube 32 to the tank or other receptacle for the water that is to be treated.

By utilizing the finger 20 and the graduated scale on the face of disc 19, the inlet of air through the valve and into the container may be very accurately regulated and as a result, the flow of liquid from the container into the water to be treated will be correspondingly regulated and thus, the volume flow of the liquid fertilizer or the like may be only a few drops per minute or a small stream, as conditions require.

In order to bring about a uniform seepage or flow of the liquid from the valve to and through the conduit 32, the small air inlet opening 31 is provided in tube 30 and as said aperture is inclined downwardly toward its inner end, there will be no tendency for the escape of liquid through said air inlet opening.

To cut off the discharge of liquid through the valve, it is only necessary to manipulate screw plug 18 so as to seal the inner end thereof against the conical plug 22, thus cutting off the inlet of air to the container 10.

It is to be noted that the upper end of duct 25 is located a substantial distance above the opening 29 that permits liquid to flow from the container into the valve and such arrangement insures the flow of air bubbles from the upper end of the plug 13 upwardly through the liquid in the container without possibility of the incoming air passing downwardly through opening 29 into the valve.

In the construction of the device just described and illustrated in Figs. 1 to 4 inclusive, it is to be noted that the outlet end of the air inlet duct 25 is positioned in the extreme lower portion of the container 10 and a short distance above the opening 29 that permits liquid from the container to pass into the chamber within the hollow member 12.

This arrangement of the air inlet and liquid outlet is essential inasmuch as while the device is in operation, the air in the form of a row of separate bubbles discharges from the upper end of the duct 25 and passes upwardly through the liquid within the container 10 and the pulling forces of these bubbles in their travel to the top of the body of liquid within container 10 counterbalances the weight of the liquid therein so that the flow of liquid through outlet 29 into the chamber within member 12 and from thence through tubular member 31 and tube 32 is constant.

Thus the same volume flow of liquid from the container 10 prevails regardless of the gradually diminishing weight of the liquid as it discharges from the container so that, an even and uniform distribution of the liquid over the ground that is treated with liquid fertilizer is attained.

This counterbalancing of the weight of the liquid within container 10 cannot be attained where the air is discharged into an air space within the container above the liquid therein.

In the modified construction illustrated in Fig. 5, a tube 33 depends from the plug portion 34 of the valve body 35, which plug portion is seated in the mouth of the container and said depending tube 33 terminates a short distance above the bottom of the valve body 35. Passing through the bottom of the valve body and offset from tube 33 is a tube 36, the upper end of which terminates in the chamber within the valve body a substantial distance above the lower end of tube 33, thus providing a conventional trap in the lower portion of the valve body for controlling the flow of liquid therethrough and therefrom.

Depending from the lower end of tube 36 is a duct 37, preferably a flexible tube, which performs the same functions as duct 32.

Formed on the side of the valve body is a lug 38 in which is screw seated the threaded portion 39 of a needle valve 40, the tapered inner end of which is adapted to close a duct 41 that passes upwardly through the wall of the valve body 35 and through plug 34, said duct terminating at the upper end of said plug. The lower end of duct 41 communicates with a chamber 42 formed in the inner portion of lug 38 and formed through the wall of said lug and communicating with chamber 42 is an air inlet opening 43.

In this construction, the threaded body of the valve carries on its outer end a head 44 provided on its edge with a finger 45 that is adapted to co-operate with a graduated scale on the face of a disc 46 that is mounted on lug 38, thereby providing means for positioning the valve to regulate the passage of air through inlet opening 43, chamber 42 and duct 41.

In this construction, the air inlet valve is opened and then set so as to permit a predetermined volume flow of air through the valve into the container to which the valve is connected and as air is thus admitted to the container, the liquid fertilizer or the like will flow downwardly through tube 33 into the lower portion of the chamber within the valve body 35 and after filling the lower portion of said chamber said liquid will overflow into the upper end of tube 36 and then flow through said tube and through duct 37 to the water that is to be treated.

The provision of the trap in the lower portion of the chamber in valve body 35 insures constant and uniform discharge of the liquid fertilizer or the like from the container and this uniform flow is enhanced by the provision of a small air inlet port 47 that is formed through the wall of the valve body 35 at a point above the upper end of outlet tube 36.

While I have described my improved valve as being particularly designed for bringing about a constant regulated flow of liquid fertilizer from a container for foundation fertilizing purposes, it is to be understood that the valve may be utilized wherever an accurately regulated volume flow control of liquid is desired and particularly where such volume flow is relatively small or limited.

Thus it will be seen that I have provided a fluid flow control valve that is relatively simple in construction, inexpensive of manufacture and very effective in performing the functions for which it is intended.

It will be understood that minor changes in the size, form and construction of the various parts of my improved fluid flow control valve, may be made and substituted for those herein shown and described, without departing from the spirit of my invention, the scope of which is set forth in the appended claim.

I claim as my invention:

In a fluid flow control means, the combination with a container having at its lower end, an outlet and a depending neck surrounding said outlet, of a plug having its upper portion seated in said neck, said plug being provided with a fluid flow chamber, there being an outlet from the lower portion of said chamber, a substantial portion of the upper end of the plug being inclined, there being an opening formed through the lower portion of the inclined upper end of said plug, which opening communicates with the upper portion of the fluid flow chamber within the plug, there being an air inlet duct formed in said plug to the side of said fluid flow chamber, the upper end of which duct terminates above the upper end of the inclined surface at the top of said plug and means for controlling the admission of air to said air inlet duct.

WALTER GREENING.